(No Model.)
H. C. SIMPSON & A. WAGGONER.
CABLE SHEAVE AND HANGER FOR CABLE TRAMWAYS.
No. 410,700. Patented Sept. 10, 1889.
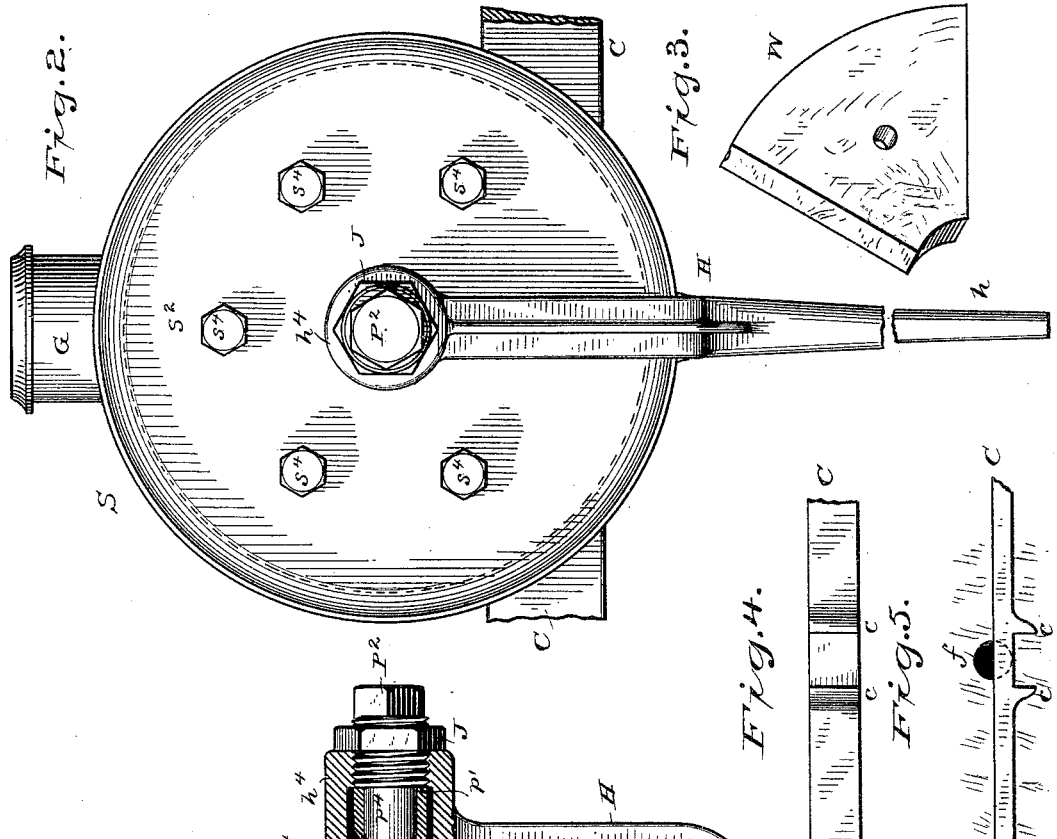

UNITED STATES PATENT OFFICE.

HARRY C. SIMPSON, OF BROOKLYN, NEW YORK, AND ALBERT WAGGONER, OF COLUMBUS, OHIO.

CABLE SHEAVE AND HANGER FOR CABLE TRAMWAYS.

SPECIFICATION forming part of Letters Patent No. 410,700, dated September 10, 1889.

Application filed June 15, 1889. Serial No. 314,448. (No model.)

*To all whom it may concern:*

Be it known that we, HARRY C. SIMPSON and ALBERT WAGGONER, citizens of the United States, residing, respectively, at Brooklyn, in the State of New York, and at Columbus, in the State of Ohio, have jointly invented a new and useful Improvement in Cable Sheaves and Hangers for Cable Tramways, of which the following is a specification.

This improvement relates to means for preventing or reducing noise, friction, and wear at the supporting-sheaves of traveling cables in cable tramways.

The present invention consists in certain novel combinations of peculiarly-constructed parts, hereinafter set forth and claimed, whereby the shaft for a loose cable-sheave is adapted to freely admit the lubricant to the rubbing-surfaces and to be readily adjusted to prevent rattling. The sheave is provided with a center filling of wood isolated from the lubricant, and the sheave and hanger are adapted to be readily removed from the trench for thorough inspection, &c.

A sheet of drawings accompanies this specification as part thereof.

Figure 1 of these drawings represents an elevation of our cable sheave and hanger, partly in vertical section. Fig. 2 represents a face view or elevation at right angles to that of Fig. 1. Fig. 3 represents a perspective view of one of the wooden segments detached; and Figs. 4 and 5 represent, respectively, an elevation and a plan, on a smaller scale, within the trench with the sheave and hanger removed.

Like letters of reference indicate corresponding parts in the several figures.

At each sheave location the trench is provided with a pair of bearings B, Fig. 4. A cross-bar C, having a pair of lugs $c$ on one side, is bolted thereto, and the floor of the trench is provided with a socket $f$, Fig. 5, beneath the bar in a line passing immediately behind the space between said lugs. The hanger H has a leg $h$, the lower end of which is fitted to said socket $f$, and a hook $h^2$, fitted to the bar C between said lugs $c$, and is thus held in its proper place, so as to be readily removed, as aforesaid.

The body of the hanger H is of U shape, and is provided at its upper ends with bearing portions $h^3$ $h^4$, which are tapped and counterbored in a given horizontal line common to both, as shown in Fig. 1, with the openings of the counterbores at the inner sides of the hanger-uprights.

A tubular plug P and a solid plug $P^2$ are screwed inwardly into the respective bearing portions of the hanger. Each is provided with a jam-nut J. Each is constructed with a circumferential shoulder $p'$, and beyond these shoulders studs $p^3$ $p^4$ project concentrically within the respective counterbores. A short tubular shaft T, smooth outside and at and within its ends, is held and supported between said plug-shoulders $p'$ and by means of said studs $p^3$ $p^4$ within its respective ends, and is provided with radial perforations for the escape of the lubricant from within it to the rubbing surfaces of the hub $s'$ of the sheave S, which is mounted upon the shaft T, so as to turn freely thereon between the inner ends of said bearing portions $h^3$ $h^4$ of the hanger.

The tubular plug P is of L shape, and its outer end is turned into vertical position and provided with a grease-cup G. Tallow or a like lubricant is forced into this cup and down through the tubular plug P into the tubular shaft T, where it becomes melted, and is distributed through the perforations of the shaft as it is required. The bearings are quickly adjusted by turning the plugs P $P^2$ and their jam-nuts J, or ordinarily those at the face of the sheave, so as to prevent rattling or undue play; and should the shaft T become expanded by heating, so as to become fast within the sheave-hub $s'$, it will turn freely on the plug-studs $p^3$ $p^4$ and simply rotate with the sheave.

The metallic portion of the sheave S comprises a pair of disks $s^2$ $s^3$, the former integral with the hub $s'$ and the latter loose thereon, together with bolts $s^4$, by which they are drawn together upon interposed wooden segments W, one of which is shown detached by Fig. 3. The bolts conveniently pass through the respective segments, as indicated in Fig. 3, and the respective disks have flanges, which mask and protect their circumferential edges, as shown in Fig. 1. The segments are preferably of wood which has been chemically treated so as to toughen it against wear. They are isolated from the lubricant by the hub $s'$.

Details which have not been specified may be of any approved description, and we do not limit our respective claims as to mechanical details except as therein specifically stated.

Having thus described said cable sheave and hanger, we claim as our invention and desire to patent under this specification—

1. In combination with a loose cable-sheave, a tubular shaft, a hanger comprising a pair of bearing portions, and screw-plugs adjustable within the respective bearing portions and having circumferential shoulders which coact with the ends of the shaft and terminal studs which project into the shaft at its respective ends, substantially as hereinbefore specified.

2. The combination of a hanger comprising a pair of bearing portions, screw-plugs adjustable within the respective bearing portions and having circumferential shoulders and terminal studs, one of the plugs being tubular and of L shape, a grease-cup applied to the latter, a tubular shaft provided with radial perforations and mounted between said shoulders upon said studs, and a cable-sheave mounted loosely upon said shaft, substantially as hereinbefore specified.

3. The combination of a hanger comprising a pair of bearing portions which are tapped and counterbored, screw-plugs adjustable within the respective bearing portions and having circumferential shoulders and terminal studs, one of the plugs being tubular and of L shape, a grease-cup applied to the latter, a tubular shaft provided with radial perforations and mounted between said shoulders upon said studs, and a cable-sheave mounted loosely upon said shaft and having a hub, the ends of which are in contact with the inner ends of said bearing portions of the hanger, and wooden segments around said hub, extending outward to the groove of the sheave, substantially as hereinbefore specified.

4. In combination with a trench having a cross-bar with central lugs and a socket beneath the same, a hanger having a leg the lower end of which is fitted to said socket, and a hook fitted to the cross-bar between its lugs and having a pair of bearing portions at top, plugs fitted to the latter, a grease-cup carried by one of said plugs, a tubular shaft, and a loose cable-sheave, substantially as hereinbefore specified.

HARRY C. SIMPSON.
ALBERT WAGGONER.

Witnesses to signature of H. C. Simpson:
R. M. OLCOTT,
J. W. FOWLER.

Witnesses to signature of Albert Waggoner:
FRED H. CROUGHTON,
EDWARD E. DUNN.